United States Patent

Caroli

[15] 3,639,719
[45] Feb. 1, 1972

[54] ELECTRODE GUIDE
[72] Inventor: Italo Caroli, Westmount, Quebec, Canada
[73] Assignee: DBM Industries Limited
[22] Filed: Dec. 9, 1969
[21] Appl. No.: 883,384

[30] Foreign Application Priority Data
  Mar. 25, 1969 Canada..................................046,694

[52] U.S. Cl................................................219/69 E
[51] Int. Cl..................................................B23k 9/16
[58] Field of Search...............................219/69 E, 69 V, 125

[56] References Cited

UNITED STATES PATENTS

| | | | |
|---|---|---|---|
| 2,490,302 | 12/1949 | Holfelder | 219/69 |
| 2,930,883 | 3/1960 | Adamec et al | 219/125 |
| 3,053,966 | 9/1962 | Landis et al. | 219/69 |
| 3,125,669 | 3/1964 | Hawthorne | 219/125 |
| 3,159,734 | 12/1964 | Cooksey et al. | 219/125 |
| 3,349,214 | 10/1967 | Vuilleumier | 219/69 |

*Primary Examiner*—R. F. Staubly
*Assistant Examiner*—Gale R. Peterson
*Attorney*—Cushman, Darby & Cushman

[57] ABSTRACT

Apparatus for use in guiding and supporting the free end of an electrode carried by an electrode discharge machine, and having a main body portion preferably connected to a supporting stand. A support sleeve is rotatably and adjustably mounted in a central aperture in the body portion. A yoke is supported in the support sleeve and has means for positioning the same. Preferably, guide rollers are provided on the yoke to guidingly engage and effect fine adjustment of the electrode. An adapter head can also be provided on the yoke to accommodate electrodes of quite small dimensions.

8 Claims, 8 Drawing Figures

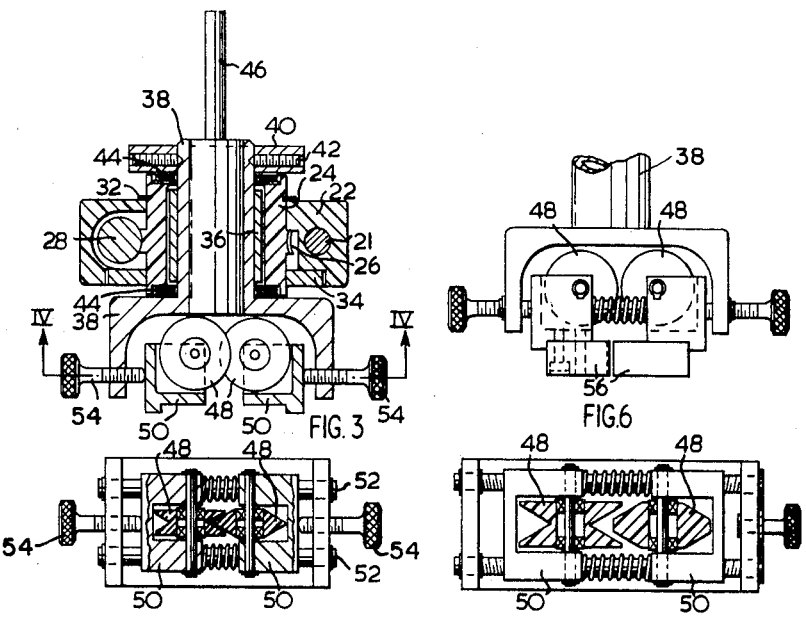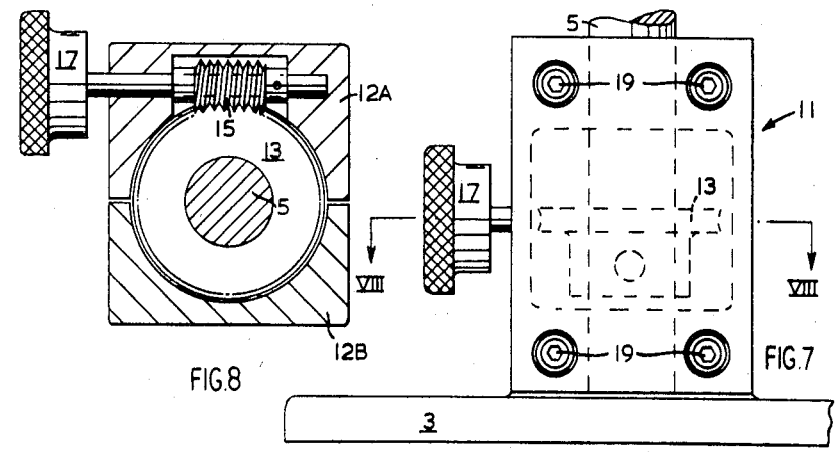

ELECTRODE GUIDE

This invention relates broadly to an electrode discharge machine, and in particular, to apparatus adapted to support an electrically conductive electrode being used in such a discharge machine.

It is known that electrode discharge machines, or electroerosion apparatus as they are also known, are used for forming blind or through holes, shaping or other similar "machining" operations on a workpiece. Canadian Pat. No. 595,932 issued on Apr. 12, 1960 to R. J. Dixon broadly describes one such apparatus, while being specifically concerned with the structure of the electrode used with the apparatus. Another type of electrode discharge machining equipment is shown in Canadian Pat. No. 727,741 which issued on Feb. 8, 1966 to R. F. Bentley et al. This patent is especially concerned with providing "electrode wear compensating means" for such equipment.

These and other similar machines have the disadvantage that very little accurate control is provided in maintaining the electrode in a specific disposition relative to the workpiece. Accurate control is frequently needed, notably in those instances when the size of the electrode becomes quite small, for example, when the dimensions thereof are in fractions of an inch. Moreover, certain articles, precision machinery and parts thereof are sometimes manufactured using such electric discharge machines, with the obvious necessity for high accuracy being inherent.

It is an object herein to provide an electrode guide by which improved control and accuracy of positioning of an electrode is obtainable.

Another object herein is to provide an electrode guide which in some forms may be attached to existing machine tools; while in another form the electrode guide is part of a complete unit including a supporting stand of its own. In either version, improved accuracy of placement of the electrode is available to a machine operator.

These and other objects and features of the present invention will become apparent to the reader from the following description. In a broad form, the present invention provides apparatus for use with an electrode discharge machine having an electrically conductive electrode, the apparatus being adapted to guide and support the free end of said electrode, during use, from any significant unintended lateral movement, comprising: a body portion having an aperture therein and being capable of being positioned in close proximity to a workpiece from which material is to be removed; a support sleeve adjustably mounted in the aperture of said body portion; a yoke eccentrically mounted within the support sleeve to be adjustably positionable relative to the same; and guide means carried by the yoke, being electrically nonconductive and operative to guidingly support the free end of the electrode therein during operation of the latter in electroeroding material from said workpiece.

In a more preferred form, the invention provides an electrode guide for use with an electrode discharge machine having an electrically conductive electrode supported therein for electroeroding material from a workpiece, said guide being adapted to guide and support the free end of said electrode, during use, from any appreciable unintended lateral movement, comprising: a main body portion having a central aperture therein, the body portion being adjustably connectable to one of a supporting stand and head of said machine to be positionable in close proximity to said workpiece; a support sleeve mounted in said aperture and being adjustably movable relative to the body portion; a yoke, eccentrically and movably mounted in the support sleeve, and being provided with actuating means thereon for moving the yoke to adjustably position the same; and guide roller means supported by the yoke, being electrically nonconductive and adapted to guidingly engage the free end of the electrode, such that an operator can position said end at a selected location relative to the workpiece.

One specific embodiment of the present invention will now be described with reference being made to the accompanying illustrative drawings, in which:

FIG. 3 is an elevation view taken in section along line 3—3 of FIG. 1;

FIG. 4 is a bottom plan view taken in section along line 4—4 of FIG. 3;

FIG. 5 is a bottom plan view also taken in section along line 4—4 of FIG. 3, but showing some modifications in the present apparatus;

FIG. 6 is a side elevation view of the yoke in the electrode guide of FIGS. 1–4, but including an adapter head added thereto for accommodating electrodes of relatively small dimensions; and FIGS. 7 and 8 are side elevation and top plan views, the latter showing in section of one form of adjustment means which are incorporated into the supporting stand on which the electrode guide of FIGS. 1–6 can be mounted.

Figure 1:
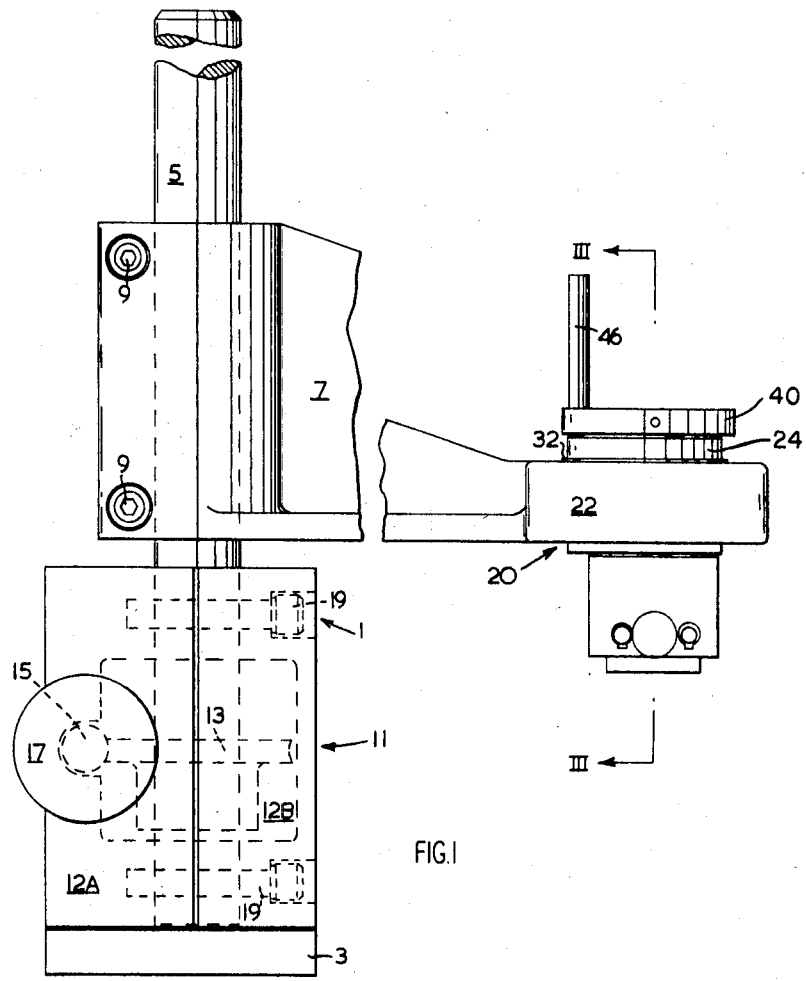
FIG. 1 is a side elevation view showing one form of the electrode guide with a supporting stand.
Figure 2:
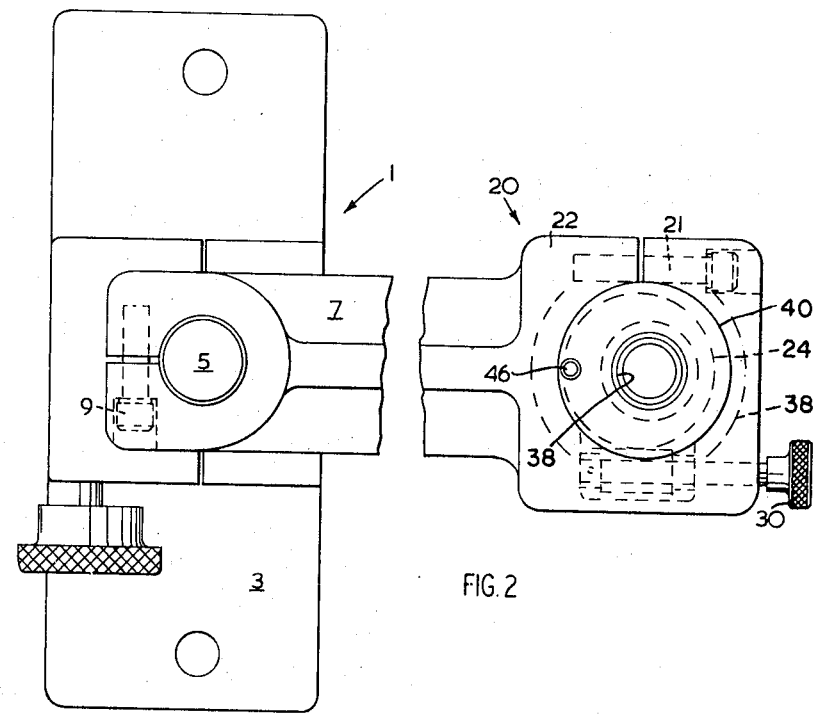
FIG. 2 is a top plan view of the apparatus of FIG. 1.

Referring now to the drawings and in particular to FIGS. 1 and 2, the numeral 20 designates one embodiment of the electrode guide herein which is mounted on a support stand shown at 1. This support stand 1 comprises a base 3 which is adapted to rest on the top of a work table or the like. An upright column 5 is rotatably mounted on the base 3 with a laterally extending support arm 7 being fixedly secured to the upright column 5 by means of fastening screws 9. The upright column 5 is supported in a two-part housing shown at 12a and 12b of adjustment means 11. The housings 12a and 12b are hollowed out to define an interior cavity which encloses a worm wheel 13 fixedly attached to the upright column 5 and being movable therewith. This worm wheel 13 is driven by means of a worm gear 15 which has a shaft provided with a manually operable adjustment knob 17. Fastening screws 19 are provided in order to connect together the two portions 12a and 12b of the housing; with the housing itself being firmly attached to the base 3. Initial control or positioning of the electrode guide 20 is hence provided by the adjustment means 11.

At the free end of the support arm 7 there is an enlarged head portion or main body portion 22 by which the electrode guide 20 is mounted. The main body portion 22 is bifurcated and is provided with a central aperture in which a generally circular support sleeve 24 is eccentrically mounted. A set screw 21 serves to adjust the tension of the forked ends of the main body portion 22. This is perhaps best seen in FIG. 2. The eccentrically mounted support sleeve 24 has a worm wheel 26 formed around the periphery thereof generally near the center of its length. This worm wheel 26 is driven by means of a worm gear 28 that is manually operable by means of a shaft and actuating knob 30. In order to facilitate rotatably mounting the support sleeve 24 in the main body portion 22, a locking circlet 32 (see FIG. 3) is provided to engage and be received in small recess or groove formed circumferentially on the outer surface of the support sleeve 24. A sleeve bearing 36 is provided interiorly of the support sleeve 24 and is disposed intermediate the latter and a supporting yoke 38. Specifically, it is the neck portion of the supporting yoke 38 that is engaged by the sleeve bearing 36. This supporting yoke 38 is mounted on the support sleeve 24 by means of a disc 40 which is provided with threaded apertures 42 for receiving a locking screw or similar fastening means. A gasket 44 is provided at both the ends of the support sleeve 24 and the upper and lower portions of the neck of the supporting yoke 38.

A tubular actuating handle 46 is provided on the disc 40 and extends therethrough. The actuating handle 46 is tubular and extends through the disc 40 and the support sleeve 24, and also the enlarged head of the supporting yoke 38 in order that an electrically conductive electrode (not shown) can extend and be fed therealong if desired. This actuating handle 46 would therefore normally be made of nonconductive material.

Although FIG. 2 shows the support sleeve 24 as being eccentrically mounted within the main body portion 22, such support sleeve could equally well be concentrically located in the central aperture of the main body portion 22. The eccentrical mounting does, however, provide a degree of finer centering or locating which is in addition to the initial and coarse adjustment already available by means of the adjustment means 11 shown in FIG. 1. Accordingly, it is to some extent a matter of choice as to whether an eccentric or a concentric mounting of the support sleeve 24 within the main body portion is to be used. This choice will normally be dependent upon a consideration of the type of work which will most frequently be carried out using the particular machine in question, and, of course, the degree of accuracy that is required. In those instances where a concentric mounting is used, the basic equipment will often provide an adequate positioning capability. However, even then the operator may wish to use an eccentric mounting and the final fine adjustment thus available to him. The actuating handle 46 of an arrangement involving a concentric mounting of the support sleeve 24 will be positioned in a known and fixed orientation relative to the electrode guide 20. Hence, the electrode could be fed and guided directly down through the tubular actuating handle. Such an arrangement assumes the use of an electrode that is readily self-supporting. In a modification of this feature, apertured inserts could be placed into the open end of the neck of the yoke 38, and the electrode supported laterally and guided that way.

The head end of the supporting yoke 38 is generally dished out to form a cavity which houses a pair of guide rollers 48 which are complementary in cross section and are of nonconducting material in order to engage an electrode disposed therebetween. These guide rollers 48 are rotatably mounted on a pair of support brackets 50 which are secured to the skirt portions of the head of the yoke 38 by means of support shafts 52. These two supporting brackets 50 are slidably mounted on the supporting shafts 52 and are laterally adjustable to position the rollers 48 by means of threaded adjustment wheels 54. With this arrangement, lateral adjustment of the guide rollers 48 in opposite directions can be obtained. FIGS. 3 and 4 show one way of providing such adjustment, while FIGS. 5 and 6 show another and equally suitable arrangement for obtaining lateral adjustment of the guide rollers 48.

In the embodiment of FIG. 5, the guide rollers 48 are dimensionally larger than the guide rollers of FIGS. 3 and 4, in order to accommodate an electrode that is itself of larger diameter. Moreover, it will be seen in the embodiment of FIG. 6 that in addition to the guide rollers 48, two adapter heads 56 are connected by suitable fastening screws or the like to the support brackets 50. These adapter heads 56 are intended to enable the electrode guide 20 to be utilized with electrodes which are quite small in size, for example, from 0.004 inch to 0.040 inch in diameter.

As previously mentioned, the support sleeve 24 may be disposed either eccentrically or concentrically of the central aperture in the main body portion 22. It should also be noted that although FIGS. 1 and 2 show the body portion 22 as being integrally connected to the support arm 7, the main body portion 22 could, in fact, be provided with a mounting bracket which is provided with apertures to enable it to be attached directly to the head of a conventional electrode discharge machine. It is expected that in those instances where the main body portion 22 had a mounting bracket connected thereto for attachment to the head of an electrode discharge machine, such a machine will probably be capable of being located sufficiently accurately that the fine adjustment provided by the eccentric mounting of the support sleeve 24 might not be necessary.

The foregoing description describes only some specific embodiments envisaged within the context of the present invention. It will readily be apparent to those familiar with this art, that adjustment other than by threaded screws or worm wheels and worm gears may be used equally well to provide the desired degree of adjustment. Some alternative arrangements have already been suggested, however, other modifications and alternatives may still be possible within the broad concept of this invention. It is, therefore, comprehended that all such modifications and alternatives are intended to be included within the present invention, as particularly defined by the appended claims.

I claim:

1. Apparatus for use with an electrode discharge machine having an electrically conductive electrode supported therein, the electrode having a free end, the apparatus being adapted to guide and support the free end of said electrode, during use, from any significant unintended lateral movement, comprising:
   a body portion having an aperture therein and being capable of being positioned in close proximity to a workpiece from which material is to be removed;
   a support sleeve adjustably mounted in the aperture of said body portion, said sleeve having a central axis and an opening offset from said axis;
   a yoke eccentrically mounted relative to said axis, in said opening in the support sleeve; and
   guide means carried by the yoke, being electrically nonconductive and operative to guidingly support the free end of the electrode therein during operation of the latter in electroeroding material from said workpiece.

2. The apparatus of claim 1, wherein said guide means comprises a pair of electrically nonconductive rollers spaced apart radially and being complementary in cross section to enable guiding said free end of the electrode therebetween.

3. The apparatus of claim 1, wherein the support sleeve is provided with a worm wheel peripherally thereof, and the body portion carries a worm gear that is manually operable and engages said worm wheel for effecting rotational adjustment of said support sleeve.

4. The apparatus of claim 3, wherein the guide means are adjustable for variably positioning the electrode.

5. The apparatus of claim 3, wherein the guide means are adjustable relative to the yoke and include an adapter head for electrodes up to approximately 0.040 inches in diameter.

6. An electrode guide for use with an electrode discharge machine having an electrically conductive electrode supported therein which has a free end for electroeroding material from a workpiece, said guide being adapted to guide and support the free end of said electrode, during use, from any appreciable unintended lateral movements comprising:
   a main body portion having a central aperture therein, the body portion being adjustably connectable to one of a supporting stand and head of said machine to be positionable in close proximity to said workpiece;
   a support sleeve mounted in said aperture and being adjustably movable relative to the body portion, the support sleeve having a central axis and an opening offset from said axis;
   a yoke mounted in said opening in the support sleeve to be eccentrically movable about said axis; and
   guide roller means supported by the yoke, being electrically nonconductive and adapted to guidingly engage the free end of the electrode, such that an operator can position said end at a selected location relative to the workpiece.

7. The electrode guide of claim 6 wherein one of the guide roller means is adjustable relative to the yoke on which it is supported for effecting fine positioning of the free end of said electrode.

8. The electrode guide of claim 6 wherein an adapter head is provided for cooperating with the guide roller means for accommodating electrodes up to approximately 0.040 inches in diameter.

* * * * *